United States Patent [19]
Cole

[11] Patent Number: 6,121,556
[45] Date of Patent: Sep. 19, 2000

[54] GRANULAR MATERIAL WEIGHING SYSTEM

[76] Inventor: Brand D. Cole, 22514 120th Ave. NE., Arlington, Wash. 98223

[21] Appl. No.: 09/236,668

[22] Filed: Jan. 26, 1999

[51] Int. Cl.[7] .......................... G01G 13/18; G01G 13/04; G01G 13/00; B65B 3/26

[52] U.S. Cl. .......................... 177/105; 177/106; 177/107; 177/108; 177/111; 177/114; 177/115; 177/119; 177/121; 177/263; 141/83; 222/77

[58] Field of Search .................................. 141/83; 222/55, 222/56, 77; 177/59, 98, 99, 100, 102, 105, 106, 107, 108, 109, 110, 111, 114, 115, 119, 120, 121, 262, 263

[56] References Cited

U.S. PATENT DOCUMENTS

| | | | |
|---|---|---|---|
| 906,214 | 12/1908 | Freeman | 222/77 |
| 1,978,558 | 10/1934 | Van Der Horst | 222/77 |
| 2,539,030 | 1/1951 | Parker | 222/77 |
| 2,619,256 | 11/1952 | Wiley | 177/105 |
| 2,661,876 | 12/1953 | Kindseth | 222/77 |
| 2,684,841 | 7/1954 | Davis | 177/121 |
| 2,833,506 | 5/1958 | Gunderson | 177/121 |
| 3,109,561 | 11/1963 | Lohse et al. | 222/77 |
| 3,134,450 | 5/1964 | Hanson | 222/77 |
| 3,256,948 | 6/1966 | Annen et al. | 177/119 |
| 3,291,233 | 12/1966 | Mayer | 177/119 |
| 3,557,847 | 1/1971 | Hebel | 177/108 |
| 3,654,970 | 4/1972 | Teboul | 177/108 |
| 3,774,818 | 11/1973 | Alexandrov et al. | 222/368 |
| 3,802,522 | 4/1974 | Thompson et al. | 177/121 |
| 3,827,513 | 8/1974 | Epstein | 177/121 |
| 4,292,877 | 10/1981 | Lee | 83/31 |
| 4,453,610 | 6/1984 | Purdie | 177/247 |
| 4,681,176 | 7/1987 | Moran et al. | 177/114 |
| 4,823,993 | 4/1989 | Siegel et al. | 222/345 |
| 4,836,315 | 6/1989 | Lee | 177/247 |
| 4,953,643 | 9/1990 | Ellion et al. | 177/123 |
| 5,005,657 | 4/1991 | Ellion et al. | 177/246 |
| 5,332,870 | 7/1994 | Strickler | 177/262 |
| 5,409,137 | 4/1995 | Bonomelli | 222/56 |
| 5,437,393 | 8/1995 | Blicher et al. | 222/77 |
| 6,056,027 | 5/2000 | Patterson | 141/83 |

FOREIGN PATENT DOCUMENTS

| | | |
|---|---|---|
| 463064 | 3/1937 | United Kingdom. |
| 2204298 | 11/1988 | United Kingdom. |

*Primary Examiner*—Randy W. Gibson
*Attorney, Agent, or Firm*—Richard C. Litman

[57] ABSTRACT

A granular material weighing system intended primarily for weighing gunpowder, but which is not limited to this application. A volumetric powder measure is used to simultaneously dispense a previously weighed batch of granular material into its final container, usually a cartridge case, while also dispensing a volumetrically measured initial batch of material onto a scale. The initial batch is close to but below the desired final weight. A dribbler is used to feed additional granular material until the scale indicates that the desired weight is reached. The powder measure may be a rotary drum or translating bar type, the scale may be a beam balance including a magnetic damping device or an electronic scale, and the dribbler may be any electronic or mechanical dribbler.

19 Claims, 12 Drawing Sheets

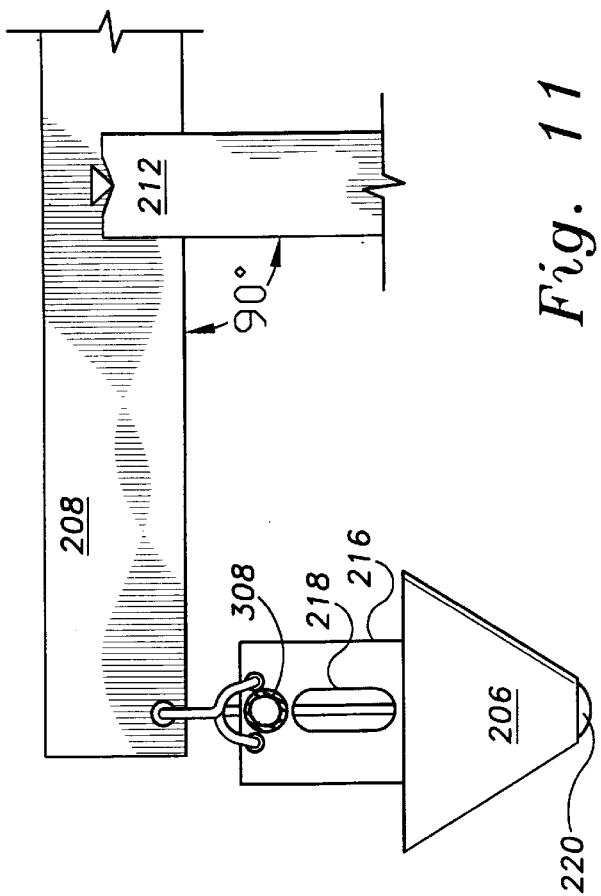
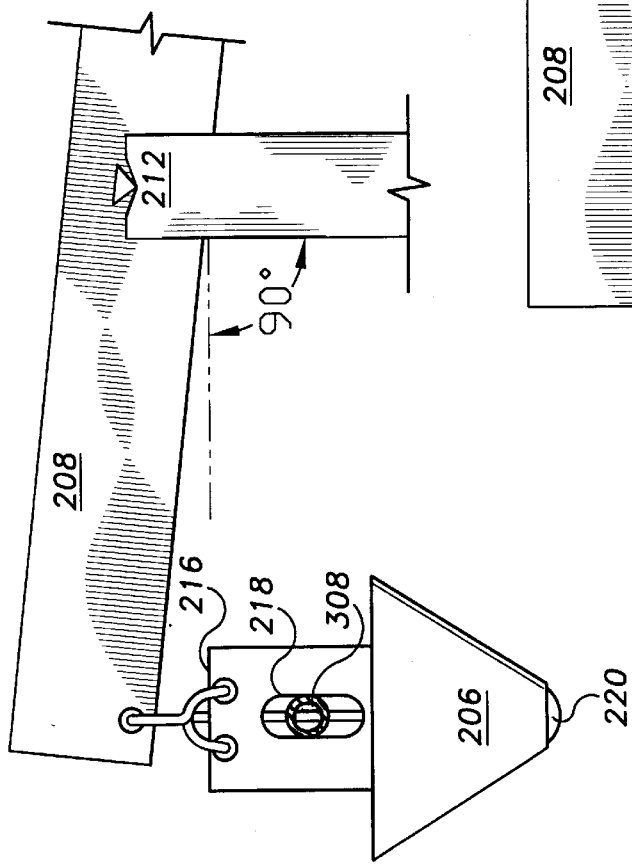

GRANULAR MATERIAL WEIGHING SYSTEM

BACKGROUND OF THE INVENTION

1. Field of the Invention

The present invention relates to weighing devices. Specifically, the invention is an apparatus for quickly and accurately weighing gunpowder. The apparatus volumetrically measures an initial powder charge close to but below the desired charge, and deposits the charge on a scale, where a dribbler slowly adds powder until the desired weight is reached.

2. Description of the Related Art

Methods of measuring or weighing granular material for accurate, consistent, and rapid dispensing have been proposed by numerous other inventors. However, none of the prior inventors within the knowledge of the present inventor has described a system wherein the granular material is first measured volumetrically in order to quickly dispense an amount close to but below the desired amount, then material is added until the exact weight is reached, whereupon the weight of the material is confirmed before dispensing it into its final container, and finally the material is dispensed into its final container while simultaneously dispensing a next volumetric measure of material onto the scale.

Like the present invention, several other proposals relate to the weighing, measuring, or dispensing of gunpowder. Shooting competitors will frequently hand-load their own ammunition in an attempt to optimize it for their particular gun and purpose. For example, high power rifle competitors, who typically engage targets as far away as 600 yards, need to have very consistent ammunition. When a gun is fired, its barrel vibrates in a sinusoidal manner. At the top or the bottom of the vibration, the barrel is relatively stable, whereas in the middle of the vibration, the barrel is rapidly moving in one direction or another. This barrel movement will result in vertical stringing of bullets on the target. Shooters will therefore attempt to find the exact type and amount of powder and correct bullet seating depth to produce exactly the right velocity so that the bullet exits the barrel at either the top or the bottom of the vibration, as determined by minimizing the vertical stringing of bullets on the target. Once the right combination is found through trial and error experimentation, the shooter will attempt to reproduce the exact combination which produced the best results. Shooters will typically weigh their powder charges to $1/10$ of a grain accuracy (with 1 grain equal to $1/7,000$ of a pound), corresponding to 5–6 granules of typical rifle powder. This accuracy is contrasted with typical factory loaded ammunition, which may have powder charges deviating from each other within a range of 0.5 grains. Simply using a volumetric powder measure, without weighing the powder charge, will result in powder charges deviating from each other within a range of 0.4 grains.

Producing cartridges loaded to this degree of accuracy increases the time spent hand-loading each individual cartridge, which is a very tedious process even without this added difficulty. Therefore, the speed with which the desired weight can be produced is critical, and second in importance only to the accuracy of the weighing. Accurate weighing is not only critical for accurate shooting, but also for safety. A cartridge generating greater than the SAAMI specified pressure for its caliber can result in severe damage to the gun and/or injury to the shooter.

Various devices for weighing, only generally similar in structure and unrelated to the art of loading powder charges, are known. One of the earliest examples of a granular dispensing device is described in U.S. Pat. No. 906,214, issued to Charles C. Freeman on Dec. 8, 1908. This patent describes a machine for boxing toothpicks. The machine dispenses toothpicks into a pocket on a rotating wheel. A second knurled wheel rotating the same direction prevents picks from jamming between the casing and the wheel. The first wheel dumps the picks into a V-shaped pocket formed by two plates hingedly connected to the wheel's casing. The rotation of the first wheel opens the V-shaped pocket after the required number of pockets have been emptied into the V-shaped pocket, thereby filling the box.

U.S. Pat. No. 1,978,558, issued to Ernst C. Von Pritzelwitz Van Der Horst on Oct. 30, 1934, describes an automatic weighing machine for viscous liquids. The machine dispenses liquid into a weighing vessel on one end of a beam balance; When the weight of the liquid pulls the beam balance horizontal, the inlet valve is pulled shut, and the outlet valve is opened. Various damping devices cause the balance to remain briefly in a horizontal position when empty, allowing the user to confirm the calibration.

Although U.S. Pat. No. 2,539,030, issued to Randal C. Parker on Jan. 23, 1951, describes a gunpowder weighing device, it is not similar to the present invention. The powder is fed from a hopper, through a horizontal feed screw, into the pan of a beam balance until the desired weight is reached. The powder is then dumped through a funnel leading to the cartridge casing.

Other inventions consider processes which dribble or deliver granular material more precisely. U.S. Pat. No. 2,661,876, issued to Harold V. Kindseth on Dec. 8, 1953, describes a device for automatically opening and closing the valve-acting gates of feeding hoppers for packaging machinery. The device is actuated by the weight of the material to be packaged. Material is first fed into the balance receptacle by a bulk feeding system having a feed screw at the bottom of a hopper, and then topped off by a dribble feed system. When the motor is activated, the hopper gates are opened. Once the beam balance comes close to indicating the desired weight, the bulk feeder is closed, and the dribble feeder is used to add the remaining material.

U.S. Pat. No. 2,833,506, issued to Norman R. Gunderson on May 6, 1958, describes a scale for weighing granular material. The granular material is fed from a hopper into the pan of a beam balance. A sliding weight at the other end of the beam balance is set to the desired weight. A pair of electrical contacts are located at the end of the beam having the sliding weight. The contacts act as switches for an electric vibrating mechanism comprising a speaker and a voice coil connected to the hopper. With both contacts closed, the hopper vibrates at maximum speed, filling the pan quickly. As the beam balance begins to tilt towards its balanced position, one of the two contacts moves from its closed to its open position, reducing the power available and therefore slowing the hopper's vibration. As the beam balance reaches horizontal, the second contact moves to the open position, stopping the hopper's vibration. Unlike the present invention, this invention relies on the slower process of using a rapid feed to begin dispensing material, followed by a slower speed as the correct weight is reached.

U.S. Pat. No. 3,109,561, issued to Paul Lohse and Adolf Stambera on Nov. 5, 1963, describes a weighing and dispensing device having four dispensing containers mounted on a horizontal wheel. The containers rotate between four positions. At the first position, slightly less than the target weight of pourable material is dispensed into the container.

At the second station, the container is weighed. At the third station, a dispenser controlled by the scale at the second station dispenses exactly the amount of additional material needed to achieve the desired weight. At the final station, the material is dispensed into a package which is being moved along a conveyor belt below the final station. This invention does not allow any confirmation of the final weight before dispensing the material into its final package.

U.S. Pat. No. 3,134,450, issued to Roy R. Hanson on May 26, 1964, describes a weighing device for gunpowder having a beam balance with a hopper above the weighing pan. When the beam raises the pan into an upper position, a funnel is moved into position under the hopper to discharge powder into the pan. As the beam moves to the horizontal position, the funnel is moved away from the hopper, preventing further powder from reaching the pan.

U.S. Pat. No. 3,774,818, issued to Adolf Moritsovich Alexandrov, et al. on Nov. 27, 1973, describes a proportioning and charging apparatus having a batcher in the form of an eccentric rotating cylinder, and a hopper above the batcher. The batcher has a slot which is aligned with the hopper during charging, and rotates away from the hopper when the batcher is full. The hopper has a resiliently mounted deflector at the bottom, pushing excess material into the batcher and preventing jamming.

U.S. Pat. No. 3,802,522, issued to Thomas L. Thompson et al. on Apr. 9, 1974, describes a batch weighing system. The material to be weighed is transferred to the scale's pan by a conventional feeder. The amount of material in the pan is weighed, and compared with the desired weight. The amount of material dispensed by the feeder for the next batch is adjusted based on the difference between the actual and desired weight of the current batch. This invention allows for corrections only with the next batch weighed, not with the current batch, and therefore accepts some degree of inaccuracy in the current batch.

U.S. Pat. No. 3,827,513, issued to Irving Epstein on Aug. 6, 1974, describes an apparatus for measuring powder. The apparatus is a balance beam, a hopper, and an electrically powered feed screw leading from the hopper. The speed of the feed screw is determined by the position of the balance beam. A portion of the beam extends between a pair of lights and a pair of light sensors. When the beam blocks the lower light sensor from sensing the lower light, the feed screw operates at full speed. When the beam blocks both lights, the feed screw operates at half speed. When the beam blocks the upper light sensor from sensing the upper light, but allows the lower sensor to sense the lower light, the feed screw stops. Unlike the present invention, this invention relies on the slower process of using a rapid feed to begin dispensing material, followed by a slower speed as the correct weight is reached.

U.S. Pat. No. 4,292,877, issued to Richard J. Lee on Oct. 6, 1981, describes an ammunition loader. The ammunition loader's charge bar may selectively allow either powder, shot, or neither to pass from a hopper, through a metering bushing, and into a shotgun shell. If an appropriate metering bushing is not in place, the charge bar will allow material to leak when the shell is charged, providing a visual indication of the bushing's absence.

U.S. Pat. No. 4,453,610, issued to Clarence E. Purdie on Jun. 12, 1984, describes a beam balance having three weight poises. The first is on the side of the beam opposite the weighing pan, movable between graduations in one weight-unit increments. The second is on the side of the beam adjacent to the weighing pan, movable between graduations in 0.1 weight-unit increments. The third is near the end of the beam adjacent to the balance indicia, and is movable between graduations of 0.01 weight-unit increments.

U.S. Pat. No. 4,696,336, issued to Dolores D. Ellion and Max. E. Ellion on Sept. 29, 1987, describes a gun powder dispensing and measuring apparatus. The device includes a beam balance, a pair of feed screws for dispensing powder into the pan, and a sensor. One of the feed screws turns quickly for dispensing powder rapidly, and the other turns more slowly for dispensing powder more slowly. The sensor comprises a pair of light sensors opposite a pair of lights. Powder is first added to the balance's weighing pan using the rapidly turning feed screw. As the balance rotates, the balance blocks the lower sensor, changing from the fast feed screw to the slow feed screw. As the balance continues to rotate, the upper sensor is blocked, shutting off both feed screws. A spring is used to overcome the beam's initial inertia when the powder is first transferred to the pan. The spring is selected so that the force goes to zero at the time when the fast feed screw stops, and the slow feed screw starts. Unlike the present invention, this invention relies on the slower process of using a rapid feed to begin dispensing material, followed by a slower speed as the correct weight is reached, and does not address material handling considerations. Minor modifications to the basic idea described above are disclosed in U.S. Pat. No. 4,953,643, issued to Dolores D. Ellion and M. Edmund Ellion on Sept. 4, 1990, and U.S. Pat. No. 5,005,657, issued to Dolores D. Ellion and M. Edmund Ellion on Apr. 9, 1991.

U.S. Pat. No. 4,823,993, issued to Wolfgang Siegel et al. on Apr. 25, 1989, describes a bucket wheel gate for dispensing granulated material. The inlet opening has an edge for removing granular material in excess of the bucket's capacity as the bucket spins away from the inlet.

U.S. Pat. No. 4,836,315, issued to Richard J. Lee on Jun. 6, 1989, describes a balance type weighing scale having a major weight unit poise slidably mounted opposite the weighing pan, and a minor weight unit poise on the same side of the beam's pivot as the weighing pan.

U.S. Pat. No. 5,332,870, issued to Ernst Strickler on Jul. 26, 1994, describes a precision balance having a perforated funnel-shaped weighing dish for weighing flat filters. The funnel shape of the dish ensures that only the edges of the filter come in contact with the dish, preventing the deposit of residues on the weighing dish.

U.K. Pat. No. 293,636, published on Jul. 12, 1928, describes a machine for weighing and filling powdered material into bags. The material is dispensed onto a weighing container from a hopper. The downward movement of the weighing container cuts off the flow of powder and dispenses the powder into the bag as the proper weight is reached.

U.K. Pat. No. 463,064, published on Mar. 22, 1937, describes a weighing pan with an opening on top and a detachable outlet nozzle at one end.

U.K. Pat. No. 697,218, published on Sept. 16, 1953, describes a device for automatically removing batches of weighed material from a weighing machine. The device is a continuous conveyor belt which is in tension while moving materials to and from the weighing pan, and loosely rests on the weighing pan during weighing.

U.K. Pat. No. 749,399, published on May 23, 1956, describes an apparatus for cutting off the flow of material to a scale when the desired weight is reached. The device is a lever forming part of the weight indicating mechanism, which lifts a feed control mechanism to cut off the feed of material when the desired weight is reached.

U.K. Pat. App. No. 2,204,298, published on Nov. 9, 1988, describes a hopper which dispenses a fixed quantity of particulate material with each pull of a handle.

A catalog published by the mail order company MIDWAY pictures a standard rotary drum powder measure, a standard beam balance scale, and a standard electronic scale. Additionally, the catalog pictures a combination powder dispenser and electronic scale, wherein the powder dispenser is programmed to dispense a specific amount of powder onto the scale. The scale transmits weight information to the powder feeder through an infrared signal. The powder feeder uses the weight information and the dispenser's motor speed to determine the amount of powder being dispensed. The motor initially proceeds at a high rate of speed, slowing as the target weight is approached. Further details about this apparatus are found in the instruction manual for the POWDERMASTER electronic powder dispenser, and the POWDER PRO digital scale, both marketed by RCBS Operations.

None of the above publications describes a system allowing the combination of advantages of the present invention. Specifically, they do not provide the combined advantages of dispensing the previously weighed powder into its final container while simultaneously dumping a measured volume close to but below the desired weight onto the scale, adding additional powder until the desired weight is reached, automatically cutting off the flow of powder when the desired weight is reached, and allowing the user to confirm the correct weight before deciding to dump the weighed powder into the cartridge casing. None of the above inventions and patents, taken either singularly or in combination, is seen to describe the instant invention as claimed. Thus a granular material weighing system solving the aforementioned problems is desired.

SUMMARY OF THE INVENTION

The invention is an apparatus for quickly and accurately measuring granular material. The invention is primarily directed towards gunpowder, but is suited to any granular material which must be quickly and accurately weighed for dispensing into its final packaging. In the case of gunpowder, the final packaging will be a sized, primed cartridge case of the appropriate caliber.

The apparatus includes a volumetric powder measure, a scale, and a dribbler. The powder measure may be either a rotating drum type or a translating bar type. The scale may be a balance beam type, preferably including magnetic damping, or an electronic scale. The dribbler may be any electronic or mechanical dribbler.

The apparatus is best understood through a description of the process of using the apparatus to weigh and dispense powder for a single cartridge case. Each individual sequence typically begins with a previously weighed charge in the scale's weighing pan. An empty, sized, and primed cartridge case of the appropriate caliber is positioned to receive the powder when a plug is lifted from the bottom of the weighing pan. When the powder measure is actuated to position its volumetric measuring container under its powder hopper, it simultaneously pulls the plug from the weighing pan, dispensing the previously weighed powder into the cartridge case. The volumetric container fills with powder from the hopper, which feeds downward into the container due to gravity.

Next, the powder measure is actuated to dispense the powder in the volumetric container into the scale's weighing pan. Actuating the powder measure in this direction simultaneously replaces the plug in the weighing pan, thereby ensuring that the powder is entirely received by this pan. The volumetric container in the powder measure is sized to dispense an amount of powder close to, but slightly below, the final desired charge. Lastly, powder is slowly fed into the weighing pan from the dribbler until the exact desired weight is reached. The dribbler will typically be located very close to the weighing pan, and will typically dispense powder through a horizontal rotating or vibrating barrel, thereby permitting a very slow feed rate for best accuracy. A new empty, sized, and primed cartridge case is placed in position to receive this powder charge, and the next actuation of the powder measure dispenses this charge into the cartridge case.

Using the above apparatus and method, powder can be accurately weighed to within 0.1 grain, and the weighing and dispensing process is faster than any other process capable of producing the desired accuracy.

Accordingly, it is a principal object of the invention to provide a weighing and dispensing apparatus for granular material which can quickly and accurately dispense the desired weight of powder.

It is another object of the invention to provide a weighing and dispensing apparatus for granular material using rapid volumetric measurement to dispense an initial batch of material onto a scale, with the initial batch being close to but below the desired weight, thereby making cycle time independent of the weight desired.

It is a further object of the invention to provide a dribbler for bringing the initial batch of material to exactly the correct weight.

Still another object of the invention is to simultaneously dispense completely weighed granular material into its final container while simultaneously dispensing the next initial batch of granular material into the weighing pan, thus eliminating wasted motion and unnecessary material handling.

Another object of the invention is to effectively prevent additional granular material from entering the weighing pan once the desired weight is reached.

An additional object of the invention is to eliminate wasted motion and unnecessary handling of granular material and equipment.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 10 is a fragmented, side view of the weighing pan portion of a beam balance and the end of a powder dribbler, as used in the first embodiment of the present invention, showing the beam indicating less than desired weight, and a weighing pan positioned to allow additional powder to enter the pan.

FIG. 11 a fragmented, side view of the weighing pan portion of a beam balance and the end of a powder dribbler, as used in the first embodiment of the present invention, showing the beam balanced and the pan positioned to block additional powder from entering the pan from the dribbler.

Similar reference characters denote corresponding features consistently throughout the attached drawings.

DETAILED DESCRIPTION OF THE PREFERRED EMBODIMENTS

Figure 1:
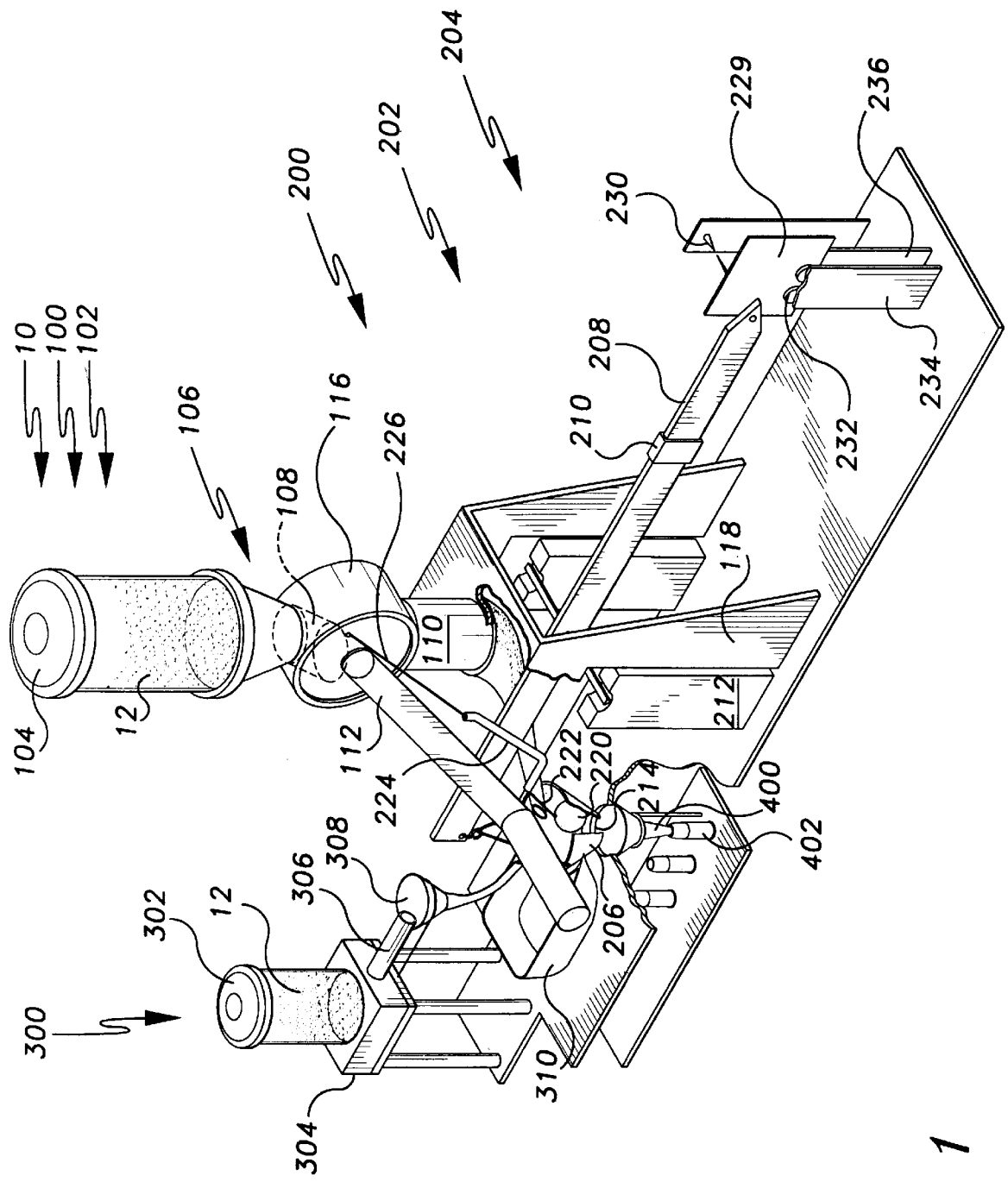
FIG. 1 is a partially cutaway, perspective view of a first embodiment of a granular material weighing system according to the present invention, shown during the dispensing operation.

The present invention is an apparatus for quickly and accurately measuring granular materials. Although the invention has applications for other granular materials, it is primarily directed towards the rapid, accurate weighing of gunpowder by those who hand-load their own ammunition.

Referring to FIGS. 1–8, the invention 10 includes a volumetric powder measure 100, a scale 200, and a dribbler 300. The volumetric powder measure 100 should have a volumetric container defined within an actuating member which reciprocates between a first position wherein it receives powder from a powder hopper and a second position wherein it dispenses powder from the volumetric container through the measure's outlet. Preferred types of powder measures 100 are a rotating drum type 102 (FIGS. 1–4), or a translating bar type dispenser 150 (FIGS. 5–8). The scale 200 may be either a beam balance 202 (FIGS. 1–2, 5–6), which preferably includes a magnetic damping apparatus 204, or an electronic scale 250 (FIGS. 3–4, 7–8). The dribbler 300 may be any electronic or mechanical dribbler capable of feeding small quantities of powder to the scale's weighing pan 206,252.

Figure 9:
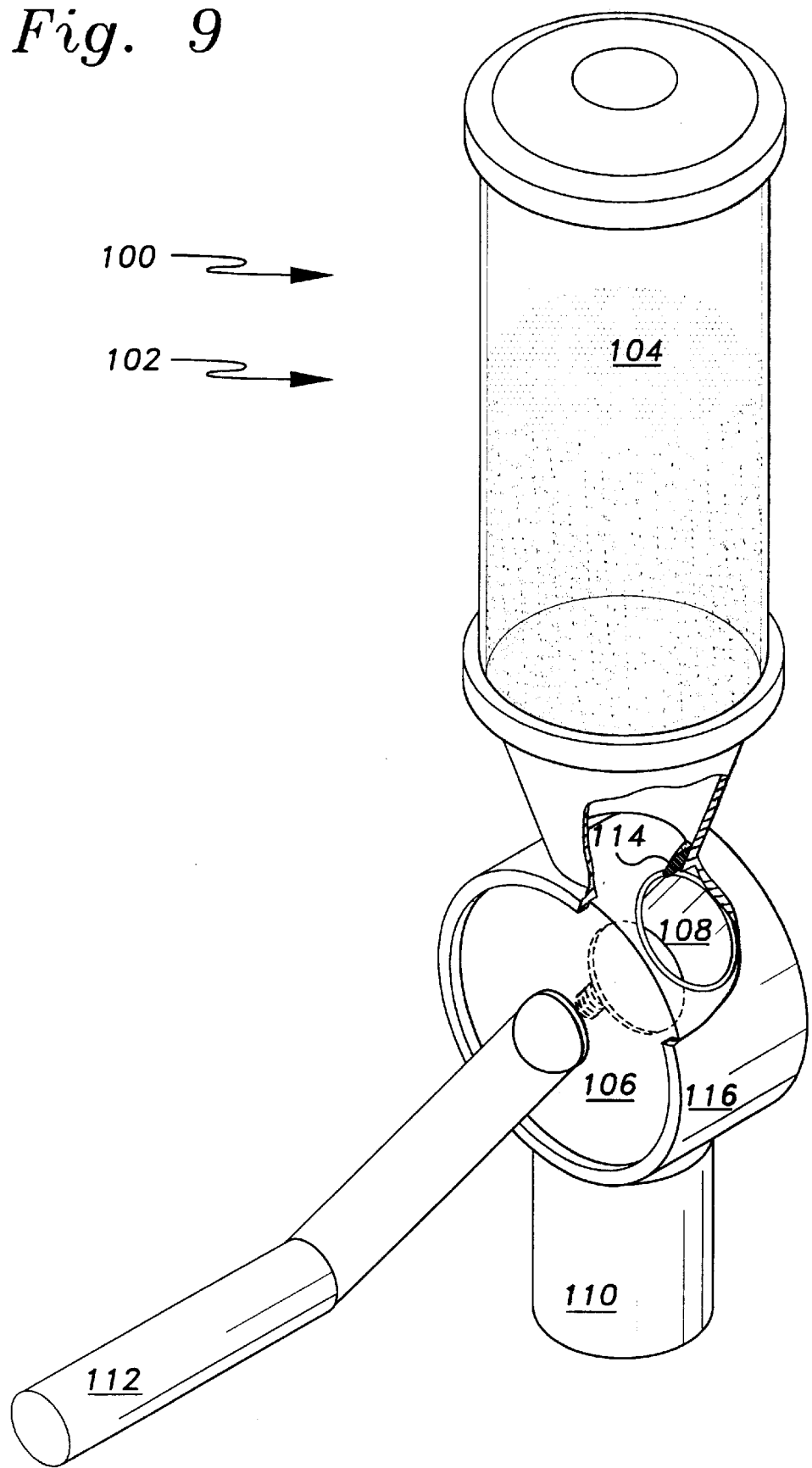
FIG. 9 is a partially cutaway, perspective view of a rotary powder measure, as used in the first and second embodiments of the present invention.

A rotary drum dispenser 102, which is well known in the art of handloading, is illustrated in FIGS. 1–4 and 9, but is best explained by referring to FIG. 9. The powder dispenser 102 includes a powder hopper 104, positioned on top of rotary drum 106. Rotary drum 106 includes volumetric container 108, which is size adjustable by means standard in the art of powder measures. Powder chute 110 is below rotary drum 106, and terminates above weighing pan 206 or 252. The rotary drum 106 is actuated by crank 112. A nontypical improvement to enhance smooth operation is resilient bumper 114, located along the bottom edge cutting surface of hopper 104. Housing 116 surrounds rotary drum 106, attaching to hopper 104 and powder chute 110.

Figure 2:
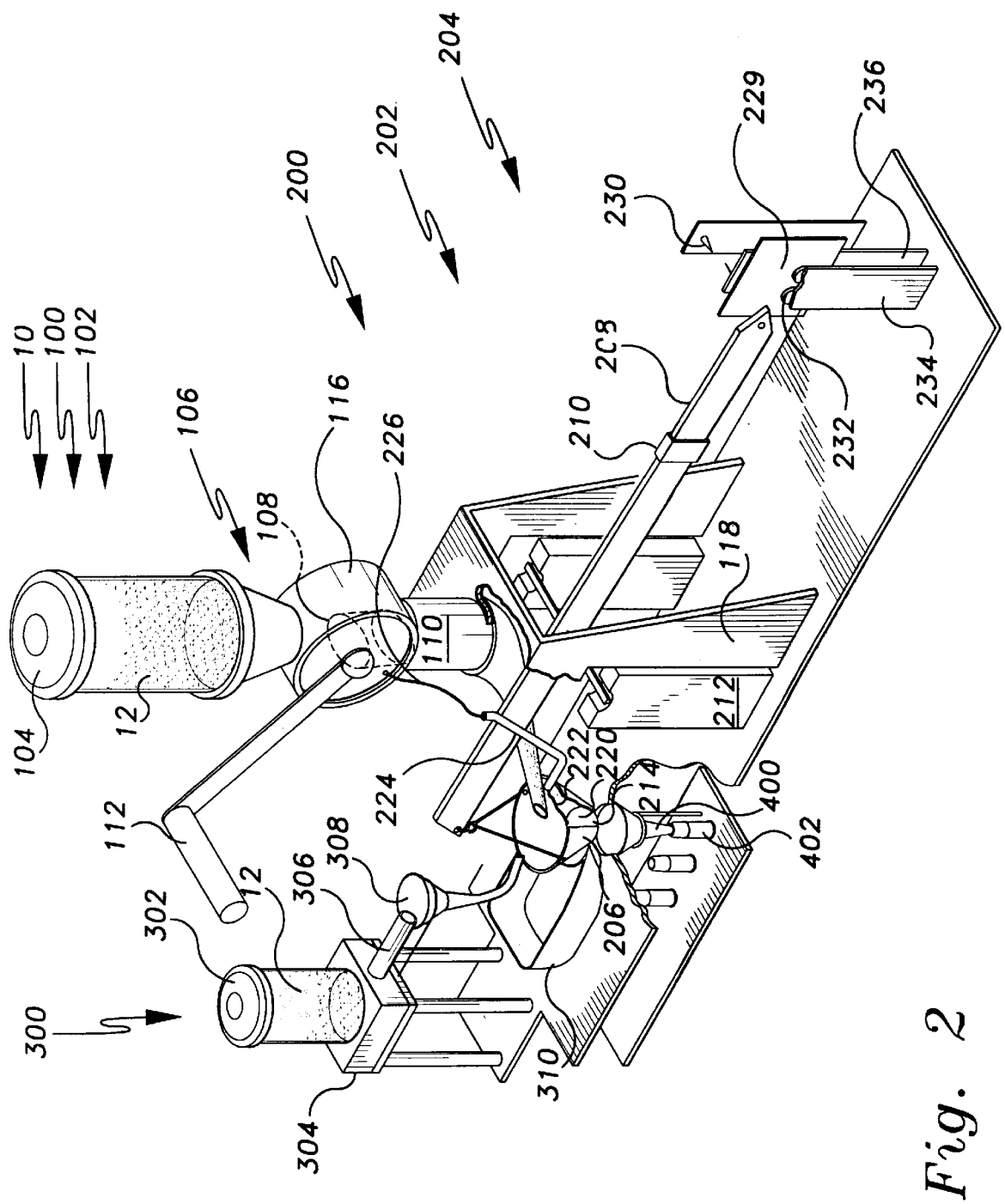
FIG. 2 is a partially cutaway, perspective view of a first embodiment of a granular material weighing system according to the present invention, shown during a weighing operation.
Figure 3:
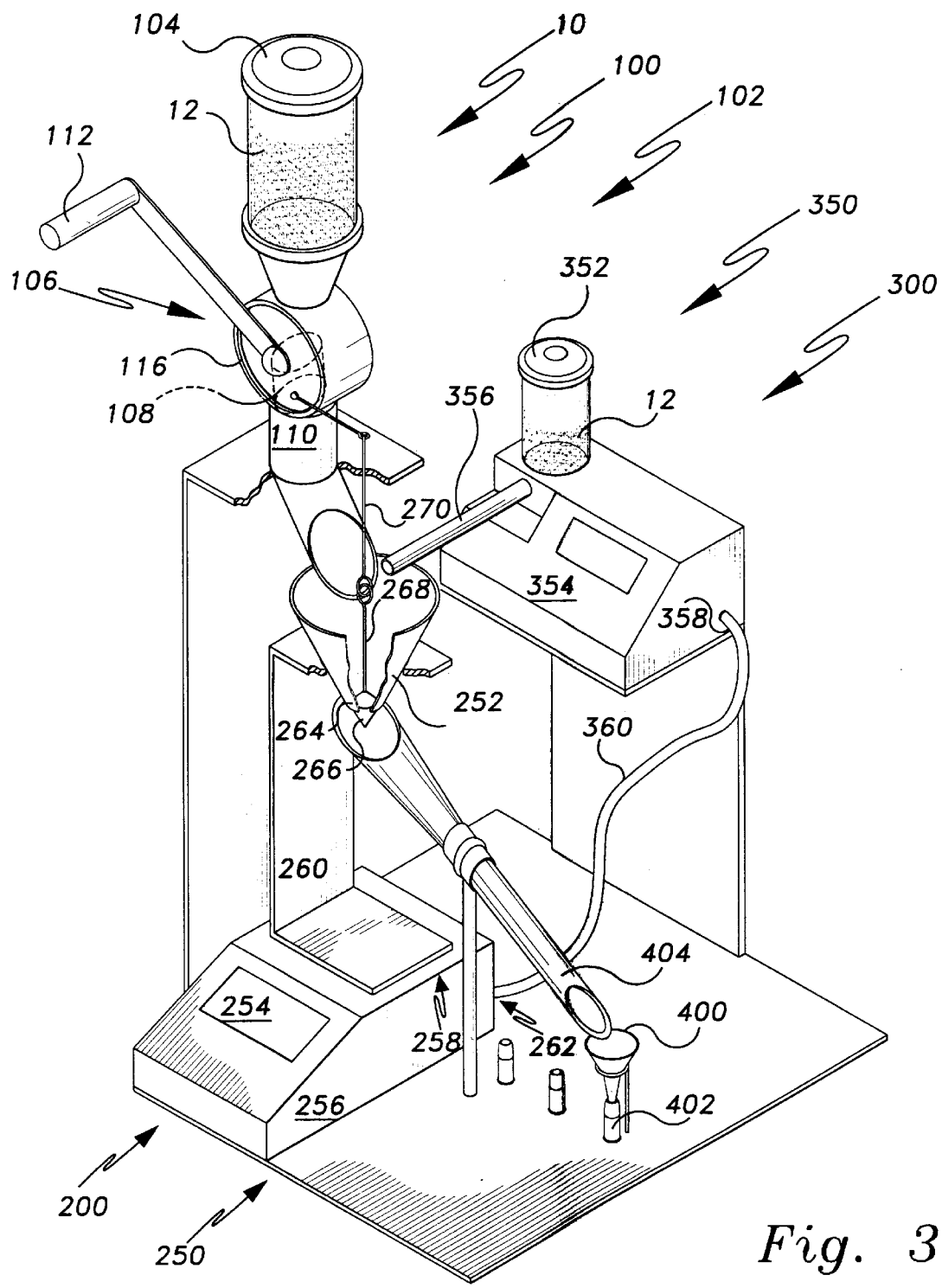
FIG. 3 a partially cutaway, perspective view of a second embodiment of a granular material weighing system according to the present invention, shown during a weighing operation.
Figure 4:
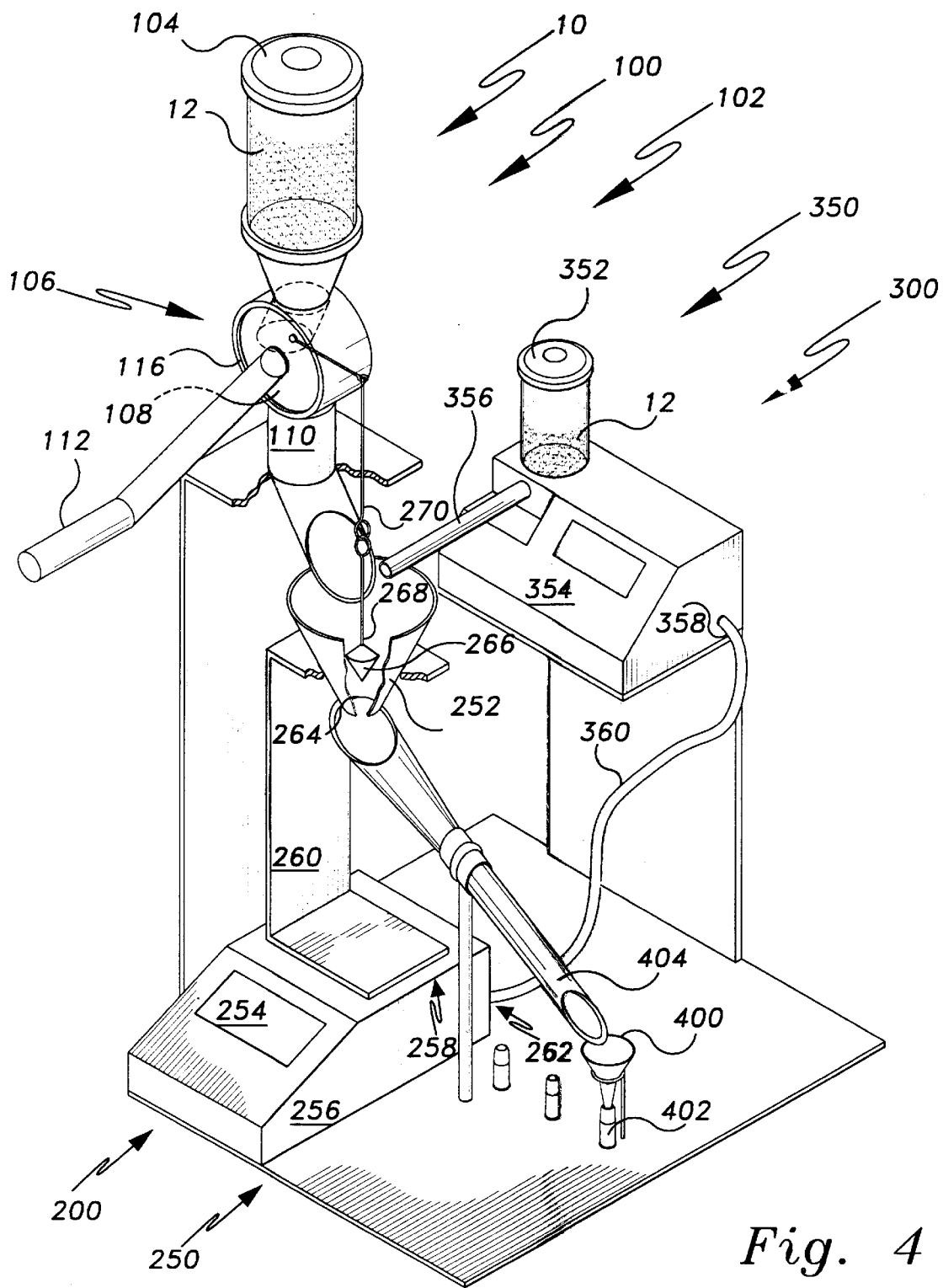
FIG. 4 is a partially cutaway, perspective view of a second embodiment of a granular material weighing system according to the present invention, shown during a dispensing operation.

To operate the rotary drum powder dispenser 102, the volumetric container 108 is first adjusted to receive the appropriate amount of powder. Crank 112 is then rotated counterclockwise to rotate drum 106, thereby bringing volumetric container 108 under powder hopper 104 (FIGS. 1, 4). Powder falls into container 108 until it is full. Crank 112 is then rotated clockwise. Powder on top of container 108 is pressed against resilient bumper 114, which deflects particles fully above the container upward, and guides granules partially within the container downward into container 108. Drum 106 is rotated to bring container 108 above powder chute 110. Housing 116 holds the powder inside container 108 during rotation. Powder then falls from container 108 through chute 110 (FIGS. 2, 3).

A translating bar powder dispenser 150 is illustrated in FIGS. 5–8, and can be explained by reference to any one of these four figures. Powder hopper 152 is on top of dispenser 150, and contains the powder 12 to be dispensed. The translating bar 154 is located below hopper 152. Attached within one end of translating bar 154 is sliding insert 156. Volumetric container 158 is defined between translating bar 154 and sliding insert 156. Threaded bolt 160 attaches sliding insert 156 to translating bar 154. Turning bolt 160 slides insert 156 to either expand or shrink volumetric container 158. Powder chute 162 is below translating bar 154, and terminates above weighing pan 206 or 252. Housing 164 surrounds translating bar 154. T-handle 166, attached to translating bar 154 opposite bolt 160, is used to actuate translating bar 154.

Figure 5:
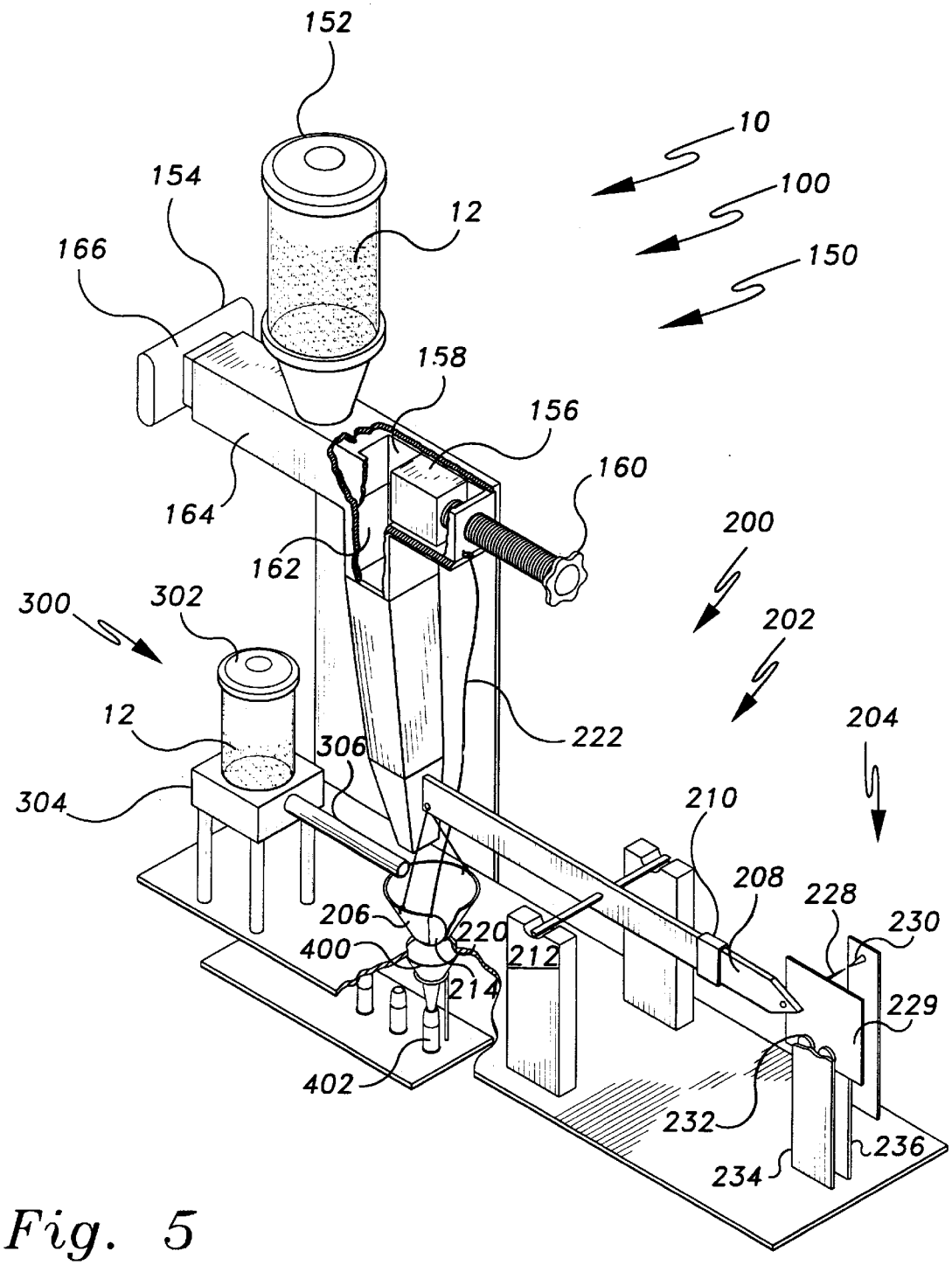
FIG. 5 is a partially cutaway, perspective view of a third embodiment of a granular material weighing system according to the present invention, shown during a weighing operation.
Figure 6:
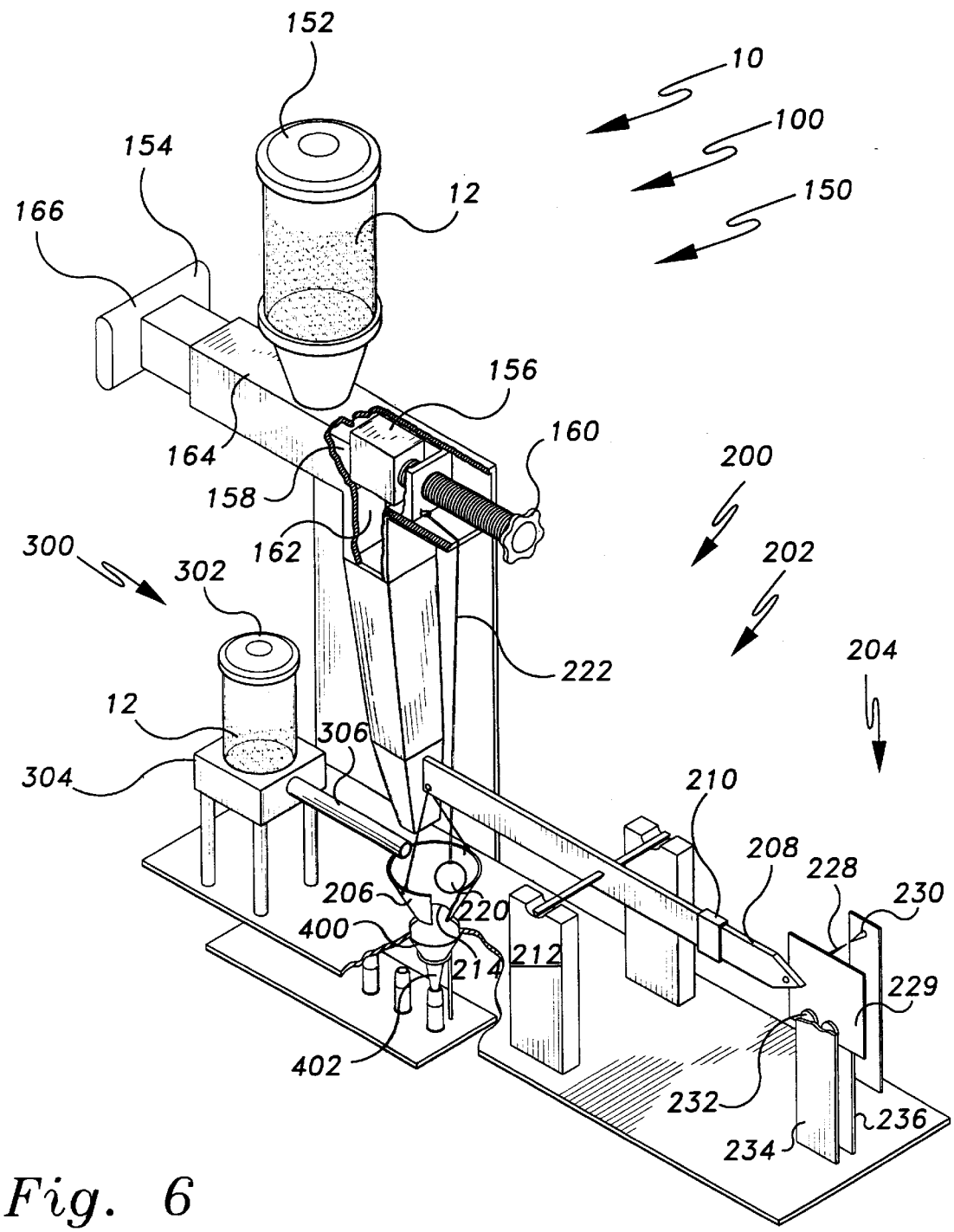
FIG. 6 is a partially cutaway, perspective view of a third embodiment of A granular material weighing system according to the present invention, shown during a dispensing operation.
Figure 7:
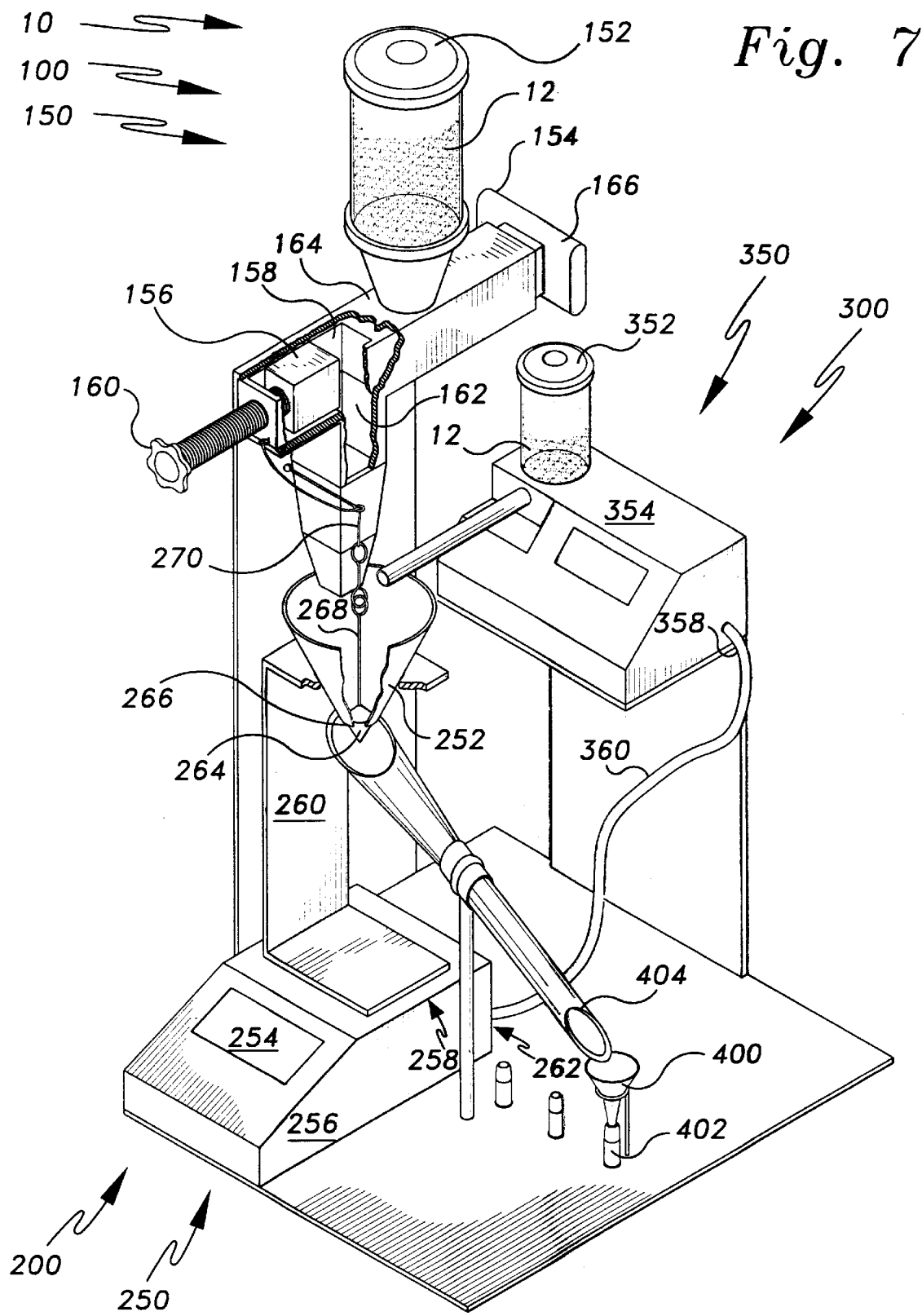
FIG. 7 is a partially cutaway, perspective view of a fourth embodiment of a granular material weighing system according to the present invention, shown during a weighing operation.
Figure 8:
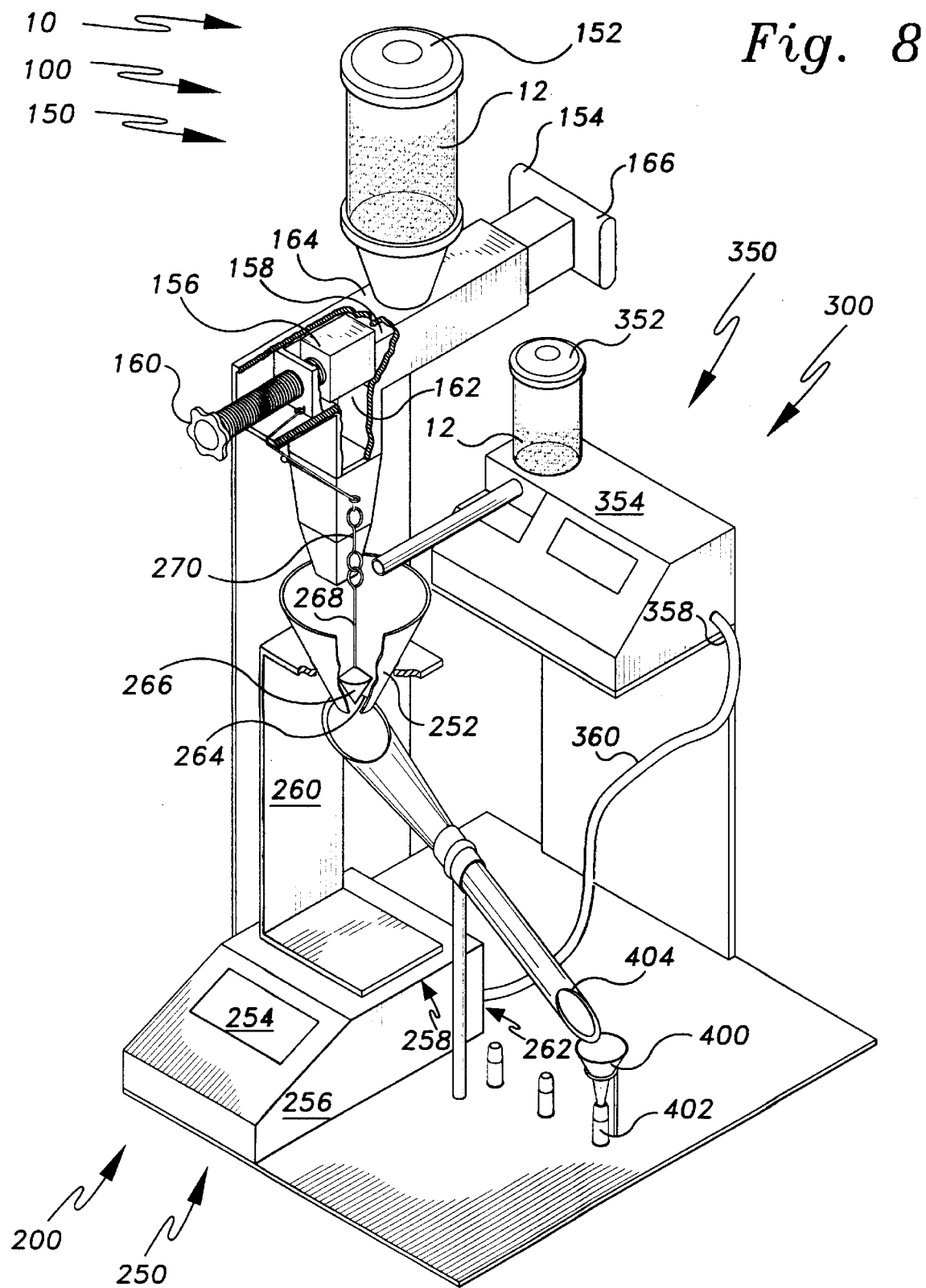
FIG. 8 is a partially cutaway, perspective view of a fourth embodiment of a granular material weighing system according to the present invention, shown during a dispensing operation.

To operate the translating bar feeder, bolt 160 is first turned to slide insert 156, thereby setting volumetric container 158 to the appropriate size. Handle 166 is pulled outward, sliding volumetric container 158 under powder hopper 152 (FIGS. 6, 8). Powder 12 falls into volumetric container 158, and is contained between translating bar 154, insert 156, and housing 164. Handle 166 is then pushed inward, moving volumetric container 158 over powder chute 162 (FIGS. 5, 7). Powder 12 then falls down powder chute 162.

Beam balance 202 is illustrated in FIGS. 1, 2, 5, and 6, and can be explained by reference to any of these figures. Beam balance 202 includes beam 208, at least one sliding weight poise 210 adjustably mounted along beam 208, stand 212, across which beam 208 is balanced, weighing pan 206 at one end of beam 208, weight poise 210, and damping device 204, attached to beam 208.

Weighing pan 206 is in the form of a truncated cone, having a hole 214 at the bottom, and a vertical shield 216 extending upward from its top edge. Vertical shield 216 defines another hole 218, whose function will be explained later. Hole 214 is plugged with plug 220, which is attached through at least one first string 222 to powder measure 100. String 222 should have the lowest mass possible consistent with the strength requirements for lifting the plug, and minimum rigidity to avoid interfering with scale operation.

If rotary drum measure 102 is used, string 222 connects with arm 224, which further connects with string 226, connecting to the rotary drum. Arm 224 slides linearly within a guide attached to powder measure stand 118. The guide is not shown in the drawing to preserve clarity, and it is well known how to guide a rigid, elongated member through a linear sliding motion. As shown in FIG. 1, it can be seen that rotating drum 106 in a counterclockwise direction to fill volumetric container 108 lifts plug 220 from hole 214. Likewise, as shown in FIG. 2, rotating the drum 106 clockwise to empty container 108 lowers plug 220 into hole 214.

If translating bar measure 150 is used, string 222 can connect directly to translating bar 154. Referring to FIG. 6, as translating bar 154 is pulled outward, moving volumetric container 158 under hopper 152, plug 220 is lifted from hole 214. Referring to FIG. 5, as translating bar 154 is pushed inward, moving volumetric container 158 over powder chute 162, plug 220 is lowered into hole 214.

Figure 12:
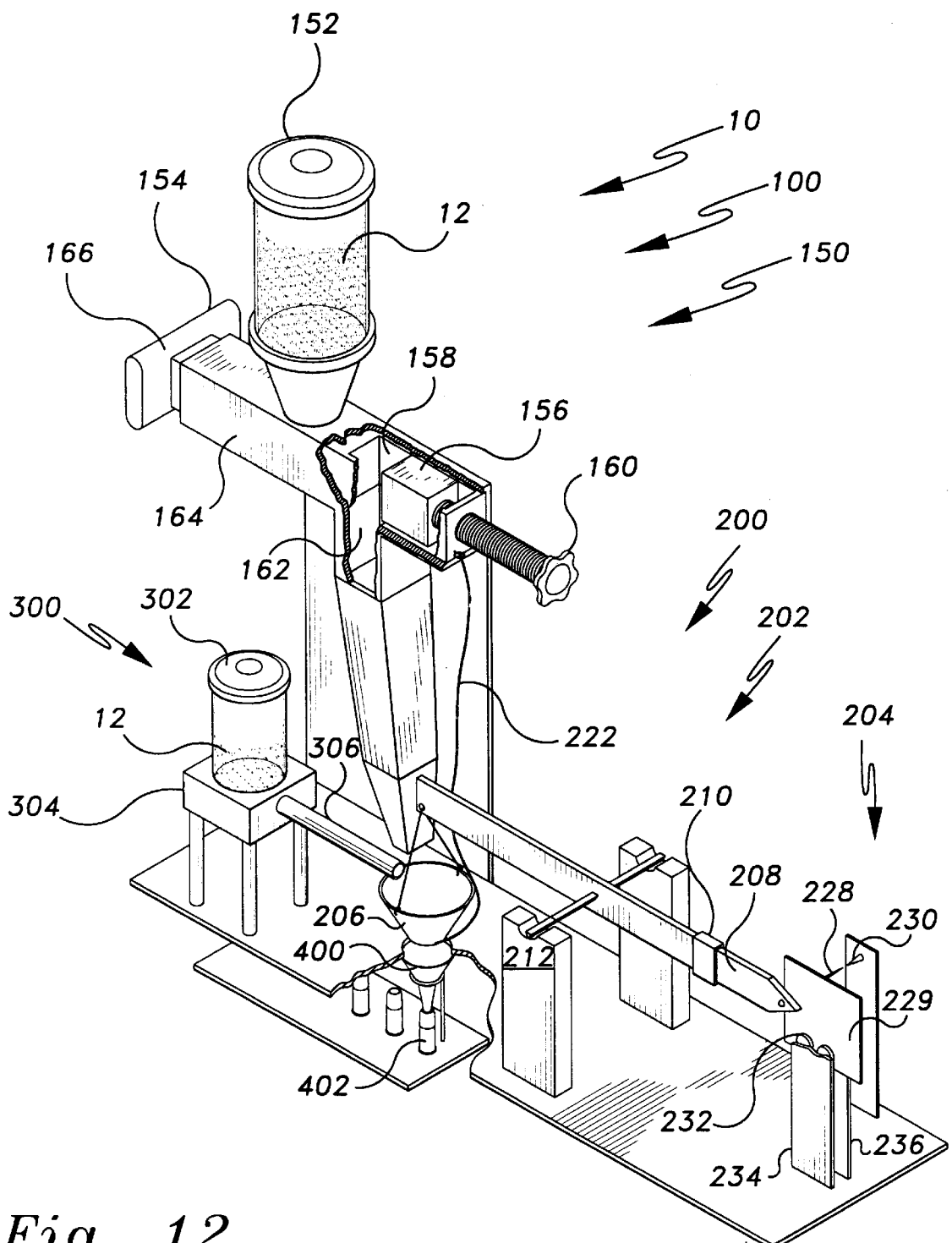
FIG. 12 is a partially cutaway, perspective view of a granular material weighing system according to the present invention, having a tilting pan substituted for the plugged pan, shown during a weighing operation.
Figure 13:
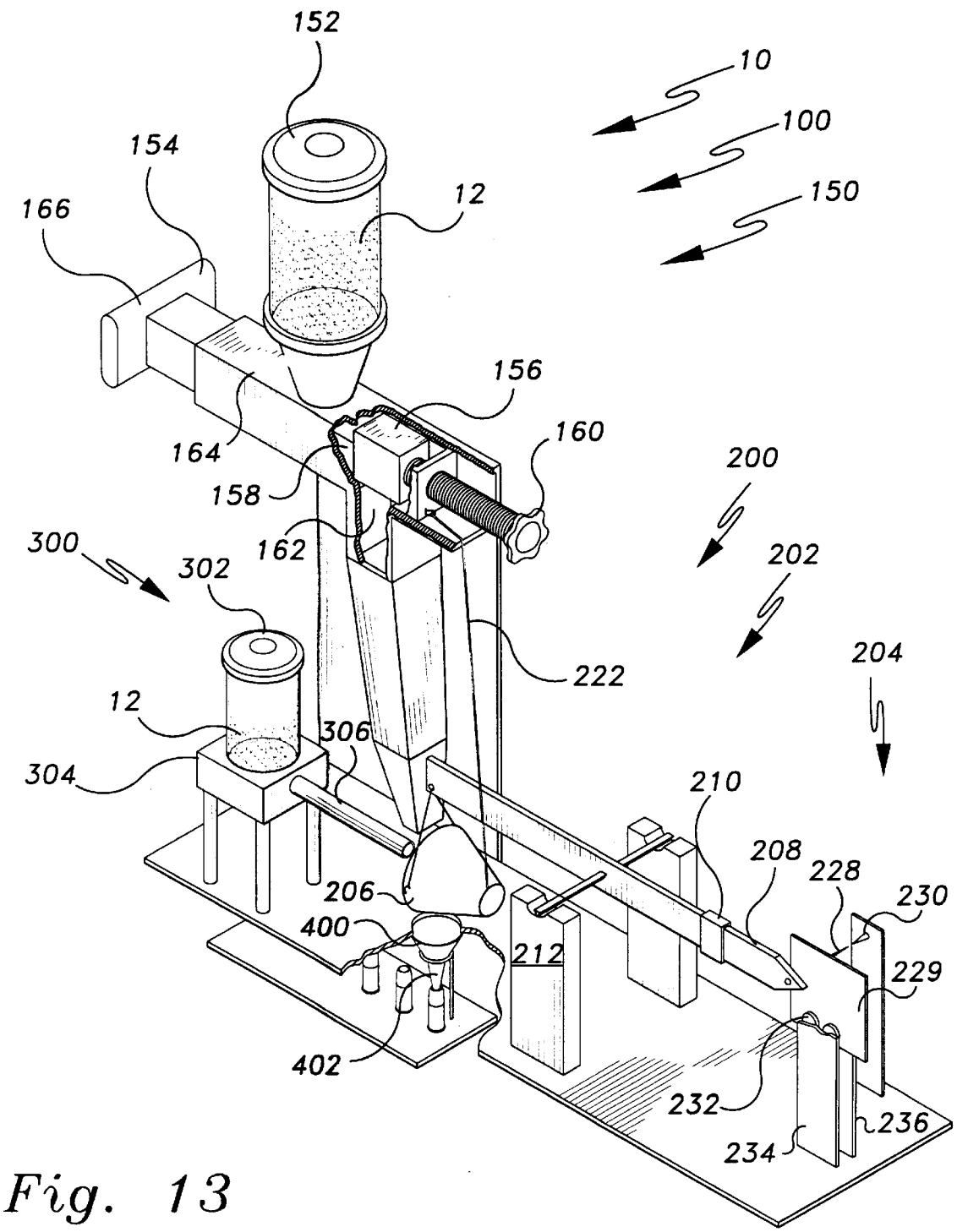
FIG. 13 is a partially cutaway, perspective view of a granular material weighing system according to the present invention, showing a tilting pan substituted for a plugged pan, shown during a dispensing operation.

An alternative weighing pan is illustrated in FIGS. 12–13. Weighing pan 206 in FIGS. 12 and 13 is a standard weighing pan. String 222 passes around the outside of weighing pan 206, connecting to the bottom of weighing pan 206. As illustrated in FIG. 12, when translating bar 154 is positioned so that volumetric container 158 is over chute 162, string 222 is not under any tension, so weighing pan 206 hangs downward from beam 208 in the conventional manner. As shown in FIG. 13, when translating bar 154 is moved so that volumetric container 158 is under hopper 152, string 222 pulls upward on the bottom of weighing pan 206, thereby tilting the weighing pan 206 so that its contents are poured into funnel 400. Although the alternative weighing pan 206 is illustrated with a beam balance 202 and translating bar powder measure 150, this weighing pan 206 may be used with any embodiment of this invention, and is illustrated with only one embodiment for simpliciy.

Because the purpose of the apparatus is to measure powder both quickly and accurately, damping device 204 is preferred and suggested for reducing the number of beam oscillations when powder is added to weighing pan 206. Damping device 204 is illustrated in FIGS. 1, 2, 5, and 6, and can be understood with reference to any one of these figures. Damping device 204 relies on the resistance created when an electrically conductive substance such as copper moves through a magnetic field. Pointer 228 lines up with balance indicator 230 when beam 208 is balanced. Copper plate 229 extends from the end of beam 208. Magnets 232 are positioned above and below balance indicator 230, on either side of beam 208. As beam 208 oscillates, copper plate 229 is moved through the magnetic field created by magnets 232, damping the beam's oscillations.

As an alternative to beam balance 202, electronic scale 250 may be used. Electronic scale 250 is illustrated in FIGS. 3, 4, 7, and 8, and can be understood with reference to any one of these figures. Electronic scale 250 includes housing 256, having numerical display 254 and weighing platform 258 (under superstructure 260) on top of housing 256. Superstructure 260 sits on top of weighing platform 258, and supports weighing pan 252. Electronic scale 250 may be zeroed while superstructure 260 and weighing pan 252 are sitting on the weighing platform 258, so that numerical display 254 will display only the weight of powder 12 contained in weighing pan 252. Electronic scale 250 also may include infrared transmitter 262, whose purpose will be explained later. In all other respects, the operation of electronic scale 250 is well known.

Weighing pan 252 is preferably in the form of a truncated cone, with a hole 264 in its bottom. Plug 266 fits within hole 264. Plug 266 is preferably in the form of a pair of cones with their wide portions joined together; however, other configurations may be used which provide a substantially convex surface, i.e. a surface without concavities or flattened areas which would potentially hinder the gravity-feed of individual granules of powder. Hook 268 projects upward from plug 266, from the point of one of the two adjoining cones, and the fit of the other adjoining cone within the hole 264 ensures that hook 268 is always oriented upward. Hook 270 is linked with hook 268, and depends downward from powder feeder 100, connecting to either the rotary drum 106 of rotating drum feeder 102, or translating bar 154 of translating bar feeder 150. As shown in FIG. 4 when rotating drum 106 is oriented so that volumetric container 108 is under hopper 104, plug 266 is lifted from hole 264. Referring to FIG. 3 rotating the drum 106 so that container 108 is above chute 110 lowers plug 266 into hole 264. Likewise, referring to FIG. 8, when translating bar 154 is positioned so that volumetric container 158 is under hopper 152, plug 266 is raised from hole 264. Referring to FIG. 7, when translating bar 154 is positioned so that container 158 is positioned over chute 162, plug 266 is lowered into hole 264.

It should be noted that when plug 266 is within hole 264, hooks 268 and 270 disengage from each other, so that hook 268 is always exerting weight on scale 250, but hook 270 is never exerting weight on scale 250. It should also be noted that the interlocking hook arrangement 268, 270 illustrated in FIGS. 3, 4, 7, and 8 could just as easily be used in the embodiments illustrated in FIGS. 1, 2, 5, and 6. Likewise, the ball and string type plug 220, illustrated in FIGS. 1, 2, 5, and 6 could just as easily be used in the embodiment shown in FIGS. 3, 4, 7, and 8. It should also be noted that other plug configurations other than the spherical or conical configurations shown may be used in order to provide a substantially convex upper surface, i.e. a surface without concavities or flattened areas which potentially hinder the gravity-feed of individual granules of powder, so long as the shape chosen for the plug mates with the hole to fulfill the purpose of fully occluding it as well.

All embodiments use some form of a dribbler 300 to bring the powder in the weighing pan to the desired weight. Dribblers 300 are well known in the art of cartridge hand-loading, and are therefore not shown in great detail beyond that necessary to understand how they are incorporated into the present invention. Dribbler basically includes powder hopper 302, feed mechanism 304, which may be an electric motor or a hand crank, and feed barrel 306, which may either be a rotary barrel with internal threads or a vibrating barrel. Preferably, the dribbler 300 includes a mechanism for stopping the powder feeding operation when the desired weight is reached, as described below.

If any embodiment including a beam balance is used, weighing pan 206 preferably includes shield 216 containing slot 218, illustrated in FIGS. 10, and 11. It should be noted that FIGS. 1 and 2 illustrate the dribbler 300 feeding powder from the end of the beam balance 202, and the shield 216 absent, for clarity. FIGS. 10 and 11 illustrate the shield 216 positioned for powder feeding from the side of beam balance 202, which is the proper method of using the shield 216. The feed barrel 306 of dribbler 300 terminates above funnel 308, which in turn terminates adjacent to shield 216. The distance between the end of funnel 308 and shield 216 should be slightly greater than the length of the largest granules of powder used, so that powder does not become trapped between funnel 308 and shield 216, interfering with the movement of beam 208. Referring to FIGS. 10 and 11, it can be seen that, when beam 208 is not horizontal, indicating that insufficient weight is in the weighing pan 206, funnel 308 is aligned with slot 218, allowing powder 12 from dribbler 300 to enter weighing pan 206 (FIG. 10). However, when beam 208 is at or below its horizontal equilibrium position, shield 216 is in front of funnel 308, directing additional powder 12 (FIG. 11), away from the weighing pan and into catch pan 310, located adjacent to weighing pan 206 (FIGS. 1 and 2).

Referring to FIGS. 3, 4, 7, and 8, if an electronic scale 250 is used, the user may choose between a standard dribbler 300 and a powder dispenser capable of communication with scale 250. Such communication will typically be the infrared transmission of weight information from the scale to the powder dispenser. An example of scale 250 and powder dispenser capable of such communication is the POWDER PRO scale and the POWDER MASTER powder dispenser, both marketed by RCBS. Such a powder dispenser 350 includes a powder hopper 352, feed control mechanism 354, including an electric motor and electronic controller, feed barrel 356, terminating over weighing pan 252, and infrared receiver 358. A fiber optic cable 360 may connect infrared transmitter 262 on electronic scale 250 to infrared receiver 358.

In all embodiments of the invention, referring to FIGS. 1–8, funnel 400 is fixedly positioned between weighing pan 206, 252 and cartridge case 402, for transferring powder between the weighing pan 206, 252 and cartridge case 402. Prior to adding powder to cartridge case 402, it has been cleaned, sized, and primed in a manner well known in the art of hand-loading ammunition. Referring to FIGS. 3, 4, 7, and 8, chute 404 leads from under weighing pan 252 of electronic scale 250 to a position above funnel 400.

Referring to FIGS. 1 and 2, the use of the invention's first embodiment is illustrated. Each cycle except the first one will typically begin with a weighed powder charge in weighing pan 206 and a cartridge case 402 positioned under funnel 400. Volumetric container 108 will be set to measure a powder charge close to but less than the final desired weight, and weight poise 210 will be positioned on beam 208 at the location corresponding to the desired final weight. Referring to FIG. 1, crank 112 of rotary powder measure 102 is first rotated counterclockwise, bringing volumetric container 108 under hopper 104 to receive powder 12. Plug 220 is simultaneously lifted from hole 214 in weighing pan 206, thereby dumping the previously weighed powder charge into the waiting cartridge case 402.

Referring to FIG. 2, crank 112 is rotated clockwise, positioning container 108 over chute 110 and dumping an initial powder charge into weighing pan 206. Plug 220 has simultaneously been lowered into weighing pan 206, so that the initial powder charge will not fall through hole 214. Dribbler 300 is then used to add powder through slot 218 in shield 216 of weighing pan 206 until beam 208 of balance 202 is horizontal. Once beam 208 is horizontal, shield 216 will block further addition of powder through dribbler 300. A new cartridge case 402 is positioned under funnel 400. Rotation of crank 112 counterclockwise dispenses the powder charge in weighing pan 206 into cartridge case 402, and begins the next cycle.

Referring to FIGS. 3 and 4, the operation of the second embodiment is shown. Each cycle except the first one will typically begin with a weighed powder charge in weighing pan 252 and a cartridge case 402 positioned under funnel 400. Volumetric container 108 will be set to measure a powder charge close to but less than the final desired weight. Electronic scale 250 will be zeroed with the superstructure 260, weighing pan 252, and plug 266 in place, and powder dispenser 350 will be set to the desired final weight and calibrated for the specific powder contained in hopper 352. Referring to FIG. 4, rotation of crank 112 of rotating drum powder measure 102 positions volumetric container 108 to receive powder from hopper 104, while simultaneously lifting plug 266 from weighing pan 252, dumping the previously weighed charge into waiting cartridge case 402.

Referring to FIG. 3, crank 112 is rotated clockwise, positioning container 108 over chute 110 and dumping an initial powder charge into weighing pan 252. Plug 266 has simultaneously been lowered into weighing pan 252, so that the initial powder charge will not fall through hole 264. Powder dispenser 350 is then used to add powder from hopper 352 to weighing pan 252 until the desired weight is reached. Rotation of crank 112 counterclockwise dispenses the powder charge in weighing pan 252 into cartridge case 402, and begins the next cycle.

The operation of the third embodiment is illustrated in FIGS. 5 and 6. Each cycle except the first one will typically begin with a weighed powder charge in weighing pan 206 and a cartridge case 402 positioned under funnel 400. Volumetric container 158 will be set to measure a powder charge close to but less than the final desired weight by moving insert 156 to the appropriate position using bolt 160, and weight poise 210 will be positioned on beam 210 at the location corresponding to the desired final weight. Referring to FIG. 6, sliding translating bar 154 using handle 166 so that volumetric container 158 is positioned to receive powder from hopper 152 will simultaneously raise plug 220 from weighing pan 206, dumping the previously weighed powder charge into waiting cartridge case 402.

Referring to FIG. 5. sliding translating bar 154 so that container 158 is positioned to dispense the initial powder charge down chute 162 into weighing pan 206 will simultaneously lower plug 220 into hole 214 of pan 206, thereby preventing powder from leaving weighing pan 206. Dribbler 300 is used to feed powder from hopper 302 into weighing pan 206 until beam 208 is balanced. A new cartridge case 402 is positioned under funnel 400. Sliding translating bar 154 so that container 158 is under hopper 152 lifts the plug 220 from weighing pan 206, dumping the weighed powder charge into cartridge case 402, and beginning the next sequence.

The operation of the fourth embodiment is illustrated in FIGS. 7 and 8. Each cycle except the first one will typically begin with a weighed powder charge in weighing pan 252 and a cartridge case 402 positioned under funnel 400. Volumetric container 158 will be set to measure a powder charge close to but less than the final desired weight by moving insert 156 to the appropriate position using bolt 160. Electronic scale 250 will be zeroed with the superstructure 260, weighing pan 252, and plug 266 in place, and powder dispenser 350 will be set to the desired final weight and calibrated for the specific powder contained in hopper 352. Referring to FIG. 8, sliding translating bar 154 using handle 166 so that volumetric container 158 is positioned to receive powder from hopper 152 will simultaneously raise plug 266 from weighing pan 252, dumping the previously weighed powder charge into waiting cartridge case 402.

Referring to FIG.7. sliding translating bar 154 so that container 158 is positioned to dispense the initial powder charge down chute 162 into weighing pan 252 will simultaneously lower plug 266 into hole 264 of pan 252, thereby preventing powder from leaving weighing pan 252. Powder dispenser 350 is then used to add powder from hopper 352 to weighing pan 252 until the desired weight is reached. Sliding translating bar 154 so that container 158 is under hopper 152 lifts the plug 266 from weighing pan 252, dumping the weighed powder charge into cartridge case 402, and beginning the next sequence.

Referring to FIGS. 12 and 13, a slight variation of the third embodiment, using the conventional weighing pan 206, without hole 214 and plug 220, is illustrated. Each cycle except the first one will typically begin with a weighed powder charge in weighing pan 206 and a cartridge case 402 positioned under funnel 400. Volumetric container 158 will be set to measure a powder charge close to but less than the final desired weight by moving insert 156 to the appropriate position using bolt 160, and weight poise 210 will be positioned on beam 210 at the location corresponding to the desired final weight. Referring to FIG. 13, sliding translating bar 154 using handle 166 so that volumetric container 158 is positioned to receive powder from hopper 152 will simultaneously raise the bottom of weighing pan 206, tilting the weighing pan and dumping the previously weighed powder charge into waiting cartridge case 402.

Referring to FIG. 12. sliding translating bar 154 so that container 158 is positioned to dispense the initial powder charge down chute 162 into weighing pan 206 will simultaneously lower the bottom of weighing pan 206, thereby allowing pan 206 to hang from beam 208 in the usual manner, and preventing powder from leaving weighing pan 206. Dribbler 300 is used to feed powder from hopper 302 into weighing pan 206 until beam 208 is balanced. A new cartridge case 402 is positioned under funnel 400. Sliding translating bar 154 so that container 158 is under hopper 152 lifts the bottom of weighing pan 206, tilting the weighing pan 206 and dumping the weighed powder charge into cartridge case 402, and beginning the next sequence.

It is to be understood that the present invention is not limited to the embodiments described above, but encompasses any and all embodiments within the scope of the following claims.

I claim:

1. A granular material weighing system comprising:
   a scale having a weighing pan, said weighing pan having a bottom, said weighing pan further having means for selectively containing or dumping a granular material;
   a volumetric measure having a hopper, an outlet, and an actuating member defining a volumetric container, said actuating member reciprocating between a first position wherein said container communicates with said hopper, and a second position wherein said container communicates with said outlet, said outlet being dimensioned and configured to discharge granular material directly into said scale's weighing pan, said actuating member being operatively connected to said weighing pan so that said operating member's first position corresponds to said weighing pan dumping the granular material, and said second position corresponding to said weighing pan containing said granular material;
   a granular material dribbler dimensioned and configured to dispense granular material into said weighing pan.

2. The granular material weighing system according to claim 1, wherein said volumetric container is size adjustable.

3. The granular material weighing system according to claim 1, wherein said measure is a rotary drum measure.

4. The granular material weighing system according to claim 1, wherein said measure is a translating bar measure.

5. The granular material weighing system according to claim 1, wherein said scale is a beam balance having a beam, said beam having a horizontal position.

6. The granular material weighing system according to claim 5, wherein said beam balance includes a damping mechanism.

7. The granular material weighing system according to claim 6, wherein said damping mechanism is a magnetic damper.

8. The granular material weighing system according to claim 5, wherein:
   said weighing pan further comprises a top edge and a vertical shield depending upward from said top edge, said vertical shield having a slot;
   said dribbler further comprising a chute, said chute being dimensioned and configured to dispense powder into said weighing pan through said slot when said beam is above said horizontal position, and to direct powder away from said slot when said beam is at or below said horizontal position.

9. The granular material weighing system according to claim 1, wherein said scale is electronic.

10. The granular material weighing system according to claim 9, wherein said scale communicates weight information to said dribbler.

11. The granular material weighing system according to claim 10, wherein:
    said scale includes an infrared transmitter; and
    said dribbler includes an infrared receiver.

12. The granular material weighing system according to claim 11, further comprising a fiber optic connection between said infrared transmitter and said infrared receiver.

13. The granular material weighing system according to claim 1, further comprising a funnel below said weighing pan's bottom hole, said funnel being dimensioned and configured to dispense powder into a container.

14. The granular material weighing system according to claim 13, wherein said granular material is gunpowder, wherein said granular material weighing system is configured to weigh powder for use in an ammunition cartridge casing, and said funnel is dimensioned and configured to dispense powder into an ammunition cartridge casing.

15. The granular material weighing system according to claim 1, wherein said means for selectively containing or dumping a granular material is a tilting pan.

16. The granular material weighing system according to claim 1, wherein said means for selectively containing or dumping a granular material comprises a hole defined within said weighing pan's bottom, and a plug dimensioned and configured to plug said hole.

17. The granular material weighing system according to claim 16, wherein the plug is a sphere and said hole is circular.

18. The granular material weighing system according to claim 17, wherein the plug includes a convex upper surface.

19. A granular material weighing system comprising:
    a scale having a weighing pan, said weighing pan having a bottom, said bottom defining a bottom hole, said weighing pan further comprising a plug, said plug being dimensioned and configured to plug said bottom hole;
    a volumetric measure having a hopper, an outlet, and an actuating member defining a volumetric container, said actuating member reciprocating between a first position wherein said container communicates with said hopper, and a second position wherein said container communicates with said outlet, said outlet being dimensioned and configured to discharge granular material directly into said scale's weighing pan, said actuating member being operatively connected to said plug so that said operating member's first position corresponds to said plug being removed from said bottom hole, and said second position corresponding to said plug fitting within said bottom hole;

a granular material dribbler dimensioned and configured to dispense granular material into said weighing pan.

* * * * *